United States Patent
Diehl et al.

(10) Patent No.: US 11,907,370 B2
(45) Date of Patent: *Feb. 20, 2024

(54) MALICIOUS/BENIGN COMPUTATIONAL BEHAVIOR DETECTION USING PARAMETRIC BEHAVIORAL PATTERN DEFINITION

(71) Applicant: CrowdStrike, Inc., Sunnyvale, CA (US)

(72) Inventors: David F. Diehl, Minneapolis, MN (US); Daniel W. Brown, Beverly, MA (US); Aaron Javan Marks, Warminster, PA (US); Kirby J. Koster, Lino Lakes, MN (US); Daniel T. Martin, Burlington, NJ (US)

(73) Assignee: CROWDSTRIKE, INC., Sunnyvale, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/019,166

(22) Filed: Sep. 11, 2020

(65) Prior Publication Data

US 2020/0410099 A1 Dec. 31, 2020

Related U.S. Application Data

(62) Division of application No. 15/585,156, filed on May 2, 2017, now Pat. No. 10,803,172.

(51) Int. Cl.
*G06F 21/56* (2013.01)
*H04L 9/40* (2022.01)
(Continued)

(52) U.S. Cl.
CPC .......... *G06F 21/566* (2013.01); *G06F 21/552* (2013.01); *H04L 63/14* (2013.01); *H04L 63/1416* (2013.01); *G06N 20/00* (2019.01)

(58) Field of Classification Search
CPC ..... G06F 21/566; G06F 21/552; H04L 63/14; H04L 63/1416; G06N 20/00
(Continued)

(56) References Cited

U.S. PATENT DOCUMENTS 8,161,548 B1 * 4/2012 Wan ................ G06F 21/566
713/188
9,239,922 B1 * 1/2016 Zhu ................... G06F 21/56
(Continued)

OTHER PUBLICATIONS

The European Office Action dated Apr. 7, 2020 for European Patent Application No. 18170195.4, a counterpart of U.S. Appl. No. 15/585,156, 5 pages.
(Continued)

*Primary Examiner* — Bryan F Wright
(74) *Attorney, Agent, or Firm* — Lee & Hayes P.C.

(57) ABSTRACT

A security agent implemented on a monitored computing device is described herein. The security agent has access to parametric behavioral pattern definitions that, in combination with canonical patterns of behavior, configure the security agent to match observed behavior with known computing behavior that is benign or malignant. This arrangement of the definitions and the pattern of behavior allow the security agent's behavior to be updated by a remote security service without updating a configuration of the security agent. The remote security service can create, modify, and disseminate these definitions and patterns of behavior, giving the security agent real-time ability to respond to new behaviors exhibited by the monitored computing device.

16 Claims, 6 Drawing Sheets

(51) Int. Cl.
*G06F 21/55* (2013.01)
*G06N 20/00* (2019.01)

(58) Field of Classification Search
USPC .......................................................... 726/23
See application file for complete search history.

(56) References Cited

U.S. PATENT DOCUMENTS

| | | |
|---|---|---|
| 2003/0212902 A1 | 11/2003 | van der Made |
| 2007/0061882 A1 | 3/2007 | Mukhopadhyay et al. |
| 2007/0300301 A1 | 12/2007 | Cangini et al. |
| 2013/0267201 A1 | 10/2013 | Gupta et al. |
| 2017/0076116 A1 | 3/2017 | Chen et al. |
| 2018/0212985 A1 | 7/2018 | Zadeh et al. |
| 2018/0322286 A1 | 11/2018 | Diehl et al. |

OTHER PUBLICATIONS

The Extended European Search Report dated Jul. 6, 2018 for European Patent Application No. 18170195.4, 10 pages.
Office Action for U.S. Appl. No. 15/585,156, dated Oct. 31, 2019, Diehl, "Parametric Behavioral Pattern Definition", 20 pages.

* cited by examiner (1) OBSERVE COMPUTING DEVICE BEHAVIOR 200

SERIES OF BEHAVIOR 202

Process creation event detected for process named gpg.exe while another instance of gpg.exe is currently running and a count of a number of types of files accessed in the last minute = 22

(2) PARAMETERIZE SERIES OF BEHAVIOR AND/OR ACCESS PoB & DEFINITION(S) 204

PATTERN OF BEHAVIOR (PoB) 206

Process creation event detected for process named: [process.name]
&
count of [process.name] currently running = [instance.count]
&
count of a number of types of files accessed in the last minute = [file.access.count]

DEFINITION 208

VALUES 206(1)

process.name = gpg.exe
instance.count = 2
file.access.count = 5

BEHAVIOR IDENTIFIER 206(2)

High confidence ransomware

DISPOSITION 206(3)

Stop all instances process.name and send notification to UI of remote security service and local administrator UI

Fig. 2A

③ DETERMINE WHETHER TEST PATTERN MATCHES A UNION OF THE POB WITH VALUE(S) OF A DEFINITION 210

TEST PATTERN 212

Process creation event detected for process named: gpg.exe
&
count of gpg.exe currently running = 2
&
count of a number of types of files accessed in the last minute = 22

UNION OF POB 206 AND VALUE(S) OF DEFINITION 208 214

Process creation event detected for process named: gpg.exe
&
count of gpg.exe currently running = 2
&
count of a number of types of files accessed in the last minute = 5

④ EMIT DEFINITION DATA UPON DETERMINING MATCH 216

EMITTED DEFINITION DATA 218

BEHAVIOR IDENTIFIER 218(1)
"High confidence ransomware"

DISPOSITION 218(2)
Stop all instances of process.name and send notification to UI of remote security service

Fig. 2B

MALICIOUS/BENIGN COMPUTATIONAL BEHAVIOR DETECTION USING PARAMETRIC BEHAVIORAL PATTERN DEFINITION

RELATED APPLICATIONS

This application claims divisional of and claims priority to U.S. patent application Ser. No. 15/585,156, filed May 2, 2017, which is incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To counter these threats, governments, enterprises, and individuals use a range of security applications and services. Typically, these applications and services scan a device for a signature of a security exploit. Responsive to finding the signature, the applications and services quarantine or delete the exploit. To recognize and properly handle new threats, these applications and services generally require updates that change configuration files of the applications and services or that provide new virus definitions that are often inadequate to identify threats. Such configuration updates risk destabilizing the host system and require advanced operating system analysis and software testing expertise, which are rarely found in a single individual. Therefore, such updates often require a team of individuals and significant turnaround time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A and 2B illustrates an example scenario illustrating the techniques for recognizing and handling behavior using parameteric behavioral pattern definitions and canonical patterns of behavior.

DETAILED DESCRIPTION

Overview

Figure 1:
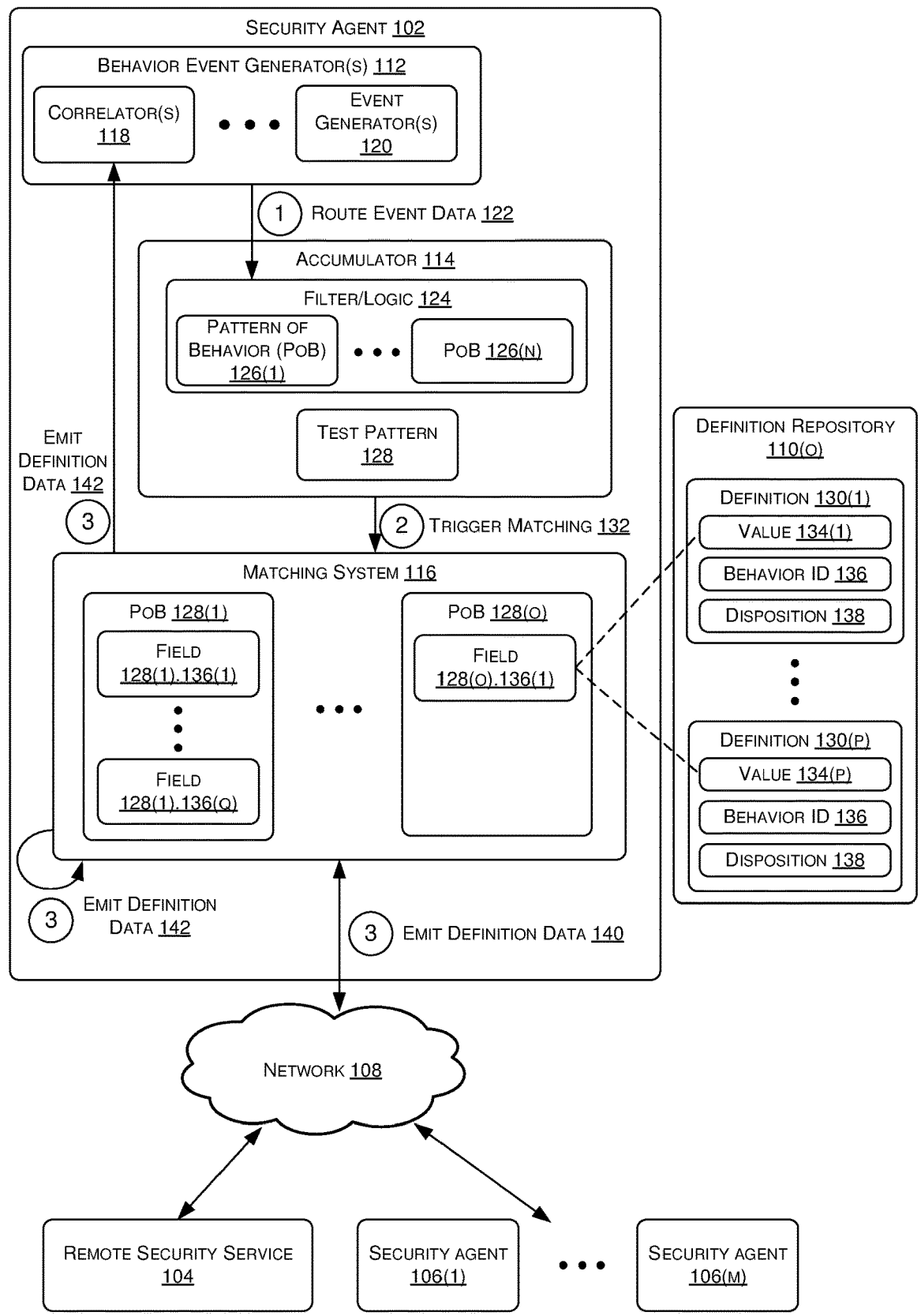
FIG. 1 illustrates an example overview of a security agent implemented on a monitored computing device and actions taken by the security agent to recognize and handle behavior exhibited by the monitored computing device using parameteric behavioral pattern definitions and canonical patterns of behavior.

This disclosure describes, in part, a security agent implemented on a monitored computing device that observes behavior exhibited by the monitored computing device, describes that behavior in a high level language, and detects whether that behavior description is indicative of malicious or benign behavior using a matching system. In some examples, the matching system is configured with a canonic pattern of behavior and accesses parametric behavioral pattern definitions that correspond to the canonic pattern of behavior. In some examples, the matching system comprises one or more regular expressions, an individual of which corresponds to the canonic pattern of behavior and parametric behavioral pattern definition. In some examples, the matching system is configured to evaluate whether a match exists between the behavior description and a plurality of defined behaviors in a single computational pass. The techniques discussed herein include creating new definitions from a series of behaviors observed at a computing device (i.e., parameterizing portions of the series of behavior), a configuration of the security agent that returns matches for behavior descriptions (i.e., test patterns) that match a canonic pattern of behavior having fields populated by parameterized values supplied by a definition, disseminating new and/or modified definitions to one or more security agents, and an application that allows a user to specify or indicate characteristics of definitions and/or initiate dissemination of a definition to one or more security agents.

Behavior descriptions are alternately referred to herein as "test patterns" and parametric behavioral pattern definitions are referred to herein as "definitions." In some examples, a definition includes a value that corresponds to a field defined by the canonic pattern of behavior. In some examples, the canonic pattern of behavior can be a description of a series of behaviors that includes an empty field. A canonic pattern of behavior (PoB) is "canonic" in that the empty (parameterized) portions of the behavior described by the PoB allow for the remaining behavior description to be generally applicable to more than one series of behavior.

For example, put in lay terms, a canonic pattern of behavior can be thought of as a "fill-in-the-blank," of sorts, where the substance (non-blank portion) of the "fill-in-the-blank" is a description of actions, activities, and/or states of a computing device (i.e., a pattern of behavior) and the blanks are parameterized portions of that pattern of behavior that are "filled in" by value(s) supplied by a definition. For example, in plain language, a canonic pattern of behavior could be "a parent process named _____ is running from command line _____ and calls a child process named _____ at command line _____." Different combinations of values could populate those blanks, each combination of which would describe a different series of behavior (e.g., "a parent process named winlogon.exe", "a parent process named powershell.exe . . . ", etc.). Canonic patterns of behavior are referred to herein alternately, but equivalently, as patterns of behavior (PoBs).

The matching system can determine whether a description of behavior observed by the security agent (i.e., a "test pattern") matches a known series of behavior by determining whether the description of behavior matches a PoB with its empty field(s) populated by value(s) supplied by a definition (i.e., a union of a PoB and the value(s)). If a match to a PoB populated with values of a particular definition is found, the matching system can emit identifiers or instructions specified by the matched definition. In some examples, the matching system includes one or more regular expressions, where an individual regular expression returns a match for the PoB with its empty field(s) populated by value(s) supplied by a definition. In some examples, these regular expressions are compiled at a remote security service and disseminated to one or more security agents.

In some examples, a definition can include a value that corresponds to a field specified by a PoB and one or more of a behavior identifier, and/or a disposition. Therefore, a union of a PoB and the value(s) of the definition that correspond to the empty fields of the PoB describes a particular series of behavior. If a test pattern matches the union of the PoB and the values of the definition, the matching system can emit one or more of the behavior identifier and/or the disposition.

This application also discusses techniques for parameterizing a series of behavior to create a PoB and/or a definition. In some examples, the techniques include accumulating a description of a series of behavior based on a behavior exhibited by a computing device and observed by the security agent, and obtaining an indication of a portion of the description of the series of behavior to parameterize. The indicated portion can be removed from the description of the series of behavior and this removed portion (i.e., parameterized portion) becomes the value of a new definition (if a definition does not exist that includes the value(s) and/or combination of value(s) of that portion). In some examples, a behavior identifier, and/or a disposition\ can be assigned to this newly created definition. If the remaining description of the series of behavior with the portion removed does not correspond to an existing PoB, a PoB can be created by generating a regular expression that returns a match for the description of the series of behavior with the parameterized portion replaced with a wildcard operator or another technique for indicating an empty field or "blank."

In some examples, once the definition is created, the definition can be disseminated to one or more security agents for use by the matching systems of the one or more security agents. If the matching system of the security agent(s) are not yet configured with the PoB, the configuration files of the matching system can be updated to include the PoB. However, in many instances, for example, the matching systems of the security agent will already be configured with a PoB that describes a pattern of behavior that corresponds to the series of behavior minus the portion removed, so the security agent merely needs to be able to access the newly created definition to recognize behavior on a monitored computing device as corresponding to the series of behavior that the union of the PoB and the value from the definition describe.

In some examples, new and/or modified definitions and/or PoBs can be created or modified at a remote security service and delivered to the security agent via a communications interface of the monitored computing device. As such, in some examples, a user interface at the remote security service can provide options for a remote operator to identify one or more of: a portion of a series of behavior to parameterize (although, in some examples, this can be done by the security agent), a value of the parameterized portion (although, in some examples, this can be done by the security agent since the security agent may already be configured with a PoB that accords with the series of behavior, but may not have encountered the particular combination of values), a behavior identifier, and/or a disposition.

In some examples, the remote operator can specify the value, behavior identifier, and/or disposition. In some examples, a non-match at the matching system and/or a disposition of a matched definition cause the security agent to send a behavior description to the remote security system for analysis. In some examples, a non-match results in no action by the security agent 102. This behavior description can already include the value and may or may not already include a behavior identifier, disposition, or other information. Regardless, a remote operator can assign or modify a behavior identifier, disposition, or other information with the value included in the behavior description, which can be compiled with the value as a definition and transmitted to one or more security agents.

The remote security service can also compile an image that includes a definition created at the remote security service based on the received indications and transmit the image to one or more security agents either automatically, once the indications are received, or upon receiving a confirmation by the remote operator. For, the remote security service can retain a repository of all the definitions (and regular expressions that correspond thereto) associated with a PoB and, upon generating an additional or modified regular expression that is associated with a new definition, the remote security service can compile a new image of the regular expressions associated with a PoB and disseminate the new image to at least one security agent. In some examples, the definitions are compiled as an image that includes the values and the matching system includes a regular expression that the values populate.

As used herein, a "series of behavior" can be a plurality of events generated by the security agent that pertain to actions, activities, and/or states of a monitored computing device. A "behavior description," also referred to herein as a "test pattern," is the security agent's accumulation of event data from the plurality of events into a high level language description of the behavior.

Example System and Techniques

The techniques described herein equip the security agent to recognize and take appropriate action in response to new behaviors observed at a monitored computing device without changing a configuration of the security agent, which would risk destabilizing the host computing device and which would require time and expertise that may not be readily available, by disseminating to the security agent parametric behavioral pattern definitions that correspond to the new behaviors.

Moreover, these techniques result in the ability to rapidly deploy updates that equip a security agent to recognize (e.g., match, classify) and handle (i.e., "know what to do") behavior the security agent observes on a monitored computing device. These techniques give entities that wage cyber battles to maintain or remove control of infected and controlled devices (such as in a command and control scheme) the flexibility and real time ability to pivot and address new threats as an adversary pivots.

These techniques can also allow the security agent to be a generalized computation mechanism that includes a hard-coded configuration of the security agent and soft-coded definitions that are made accessible to the security agent that supply information for the security agent to recognize and handle observed series of behavior. The techniques described make it possible to change behavior of the security agent without changing the hard-coded configuration of the agent.

The techniques discussed herein also ensure that the length of computation time to recognize behavior scales with the amount of the observed data, rather than scaling with the number of definitions.

In some examples, the definitions are of a small enough storage size that security agents that exist on computing devices with network connection limitations can still obtain the definition over the network whereas a configuration patch might take too much time or be impossible to receive due to the network connection limitations and the size of the patch.

FIG. 1 illustrates an example overview of an example security agent with a matching system with access to parametric behavioral patter definitions, as further discussed herein. As illustrated in FIG. 1, a security agent 102 can be configured by and communicate with a remote security service 104 and/or other security agent(s) 106(1)-(*m*) over a network 108.

In some examples, the computing device implementing the security agent 102 (referred to herein interchangeably as the "computing device and the "monitored computing device") and the device(s) of the remote security service 104 can be connected by network 108. Network 108 can include any one or more networks, such as wired networks, wireless networks, and combinations of wired and wireless networks. Further, network 108 can include any one or combination of multiple different types of public or private networks (e.g., cable networks, the Internet, wireless networks, etc.). For example, the network 108 can be a private network. In some instances, computing devices communicate over the network 108 using a secure protocol (e.g., https) and/or any other protocol or set of protocols, such as the transmission control protocol/Internet protocol (TCP/IP).

Figure 3:
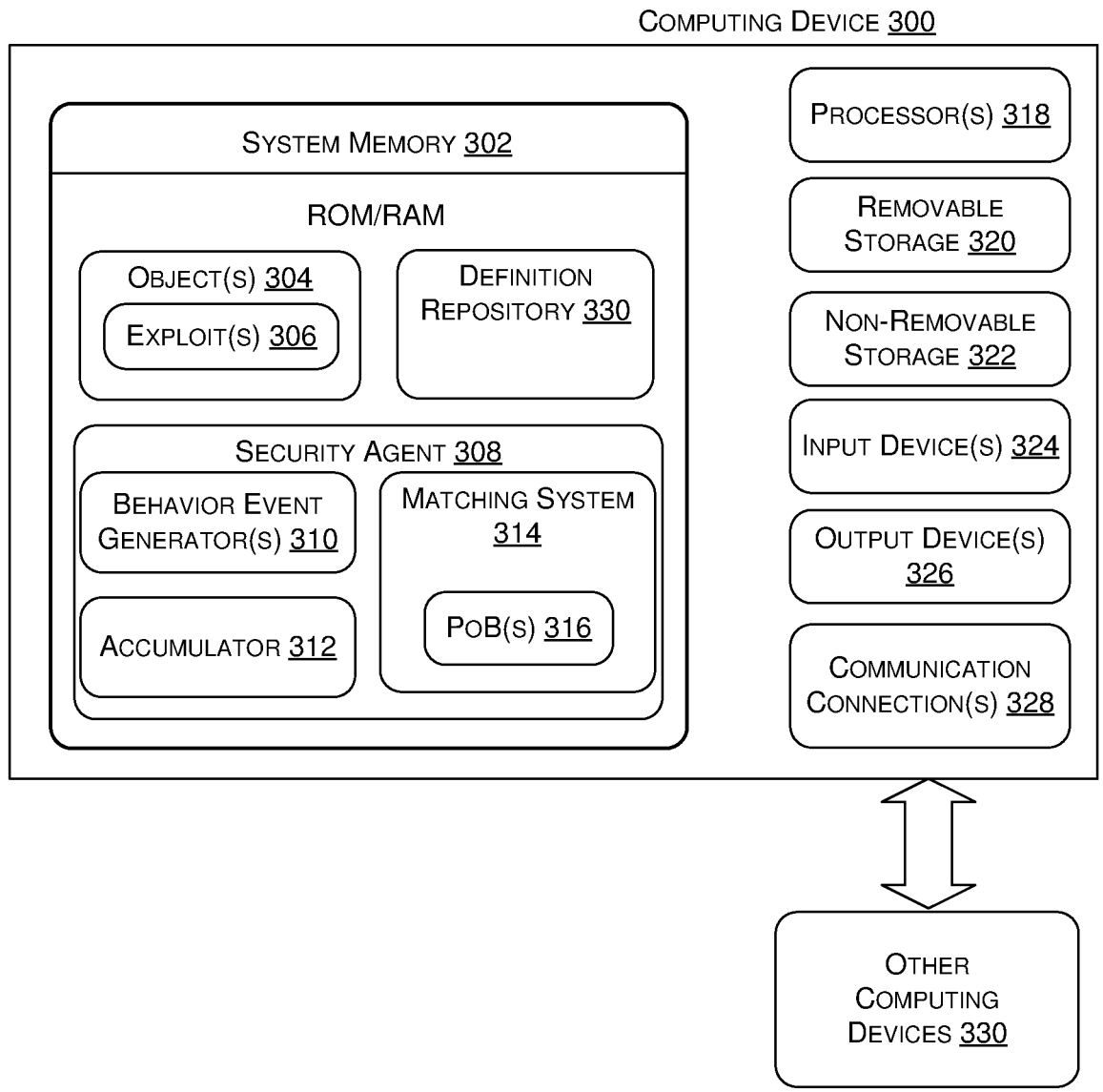
FIG. 3 illustrates a component level view of a monitored computing device configured with objects targeted by exploits and a security agent configured with canonical patterns of behavior and having access to parameteric behavioral pattern definitions.

The computing device implementing the security agent 102 and the device(s) of the remote security service 104 can each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some examples, the device(s) of the remote security service 104 represent a plurality of computing devices working in communication, such as a cloud computing network of nodes. In some implementations, one or more of the computing device implementing the security agent 102 and the device(s) of the remote security service 104 represent one or more virtual machines implemented on one or more computing devices. An example computing device capable of serving as the computing device implementing the security agent 102 is illustrated in FIG. 3 and described below regarding that figure.

In various implementations, remote security service 104 can provide security service(s) to the computing device implementing the security agent 102 and to any number of other computing devices implementing other instances of the security agent 102. The remote security service 104 can receive notifications of interesting events from security agent 102, including exploit detection event notifications, as well as forensic data associated with those interesting events. In some examples, the security agent 102 can send behavior descriptions and/or values (as discussed further below) to the remote security service 104. The remote security service 104 can determine if related notifications have been received from other instances of security agent 102 (e.g., security agents(s) 106(1)-(*m*)) and/or evaluate the interesting event(s) based on one or more rules or heuristics.

The remote security service 104 can further perform any or all of generating an event and providing the event to the security agent 102 (e.g., for diagnostic or healing purposes), generating a configuration update, generating updated or new definition(s) to the definition repository 110 accessible to the security agent 102, healing the computing device implementing the security agent 102, deceiving an adversary associated with malicious code, or notifying entities or persons associated with the computing device implementing the security agent 102 of the potential malicious code. Upon generating a configuration update or updated or new definition(s), the remote security service 104 can provide the configuration update or updated or new definition(s) (e.g., for storage in the definition repository 110) to the security agent 102, which can be stored at memory accessible to the security agent.

In some implementations, the security agent 102 can be any sort of security agent, such as a security agent implemented at the kernel-level. As shown in FIG. 1, the security agent 102 can include the behavior event generator(s) 112, accumulator 114, and matching system 116, which can include the definition repository 110, in some examples). The security agent 102 can perform at least one of monitoring events on the computing device implementing that security agent 102, maintaining state about some or all the events on that computing device, notifying the remote security service 104 of one or more events on the computing device, or taking action responsive to a security exploit associated with one or more events on the computing device. An example security agent 102 is described in greater detail in U.S. patent application Ser. No. 13/492,672, entitled "Kernel-Level Security Agent" and filed on Jun. 8, 2012.

Generally, in some examples, the behavior event generator(s) 112 observe, record, and/or describe actions, activities, and/or stores of a monitored computing devices. These behavior event generator(s) 112 can non-exhaustively include one or more of correlator(s) 118, such as the correlator described in more detail in U.S. patent application Ser. No. 15/096,027, entitled "Correlation-Based Detection of Exploit Activity" and filed on Apr. 11, 2016 or U.S. patent application Ser. No. 14/048,920, entitled "Event Model for Correlating System Component States" and filed on Oct. 8, 2013, or event generator(s) 120 described in more detail (using different terminology) in U.S. patent application Ser. No. 13/492,672, entitled "Kernel-Level Security Agent" and filed on Jun. 8, 2012.

In some examples, the event generator(s) 120 observe all sorts of events, including events associated with objects or activities of interest. Objects or activities of interest are objects or activities specified by a configuration of security agent 102 and/or correspond to at least a portion of a canonical pattern of behavior (PoB). In various embodiments, an object may be any process or thread executing on the monitored computing device. For example, the object may be an Internet browser plug-in thread or email application thread. Such objects may be specific objects of interest that are known to be vulnerable to security exploits. Further, when compromised by a security exploit, the object may perform one of a number of specific activities that are indicative of the security exploit. For example, when an Internet browser plug-in thread is compromised, activities such as command line interface (CLI) creation, process migration, installation, or portable executable (PE) creation and execution may be indicative of compromise of the Internet browser plug-in thread by a security exploit.

Such objects of interest may include processes or threads of the computing device that may be vulnerable to security exploits (e.g., return-oriented programming (ROP) or shellcode). The activities of interest may include those that enable the exploit to gain persistence, migrate to other processes, steal credentials, etc. Example objects of interest can include Internet browser plug-in threads (e.g., Flash threads) or email application threads. When the object is an Internet browser plug-in thread, example activities can include command line interface (CLI) creation, process migration, installation, or portable executable (PE) creation and execution. The filter/logic 124 can, for example, determine that event data is associated with an object of interest because a registry entry accessed as part of the event described in the event data is associated with an object specified by the configuration of security agent 102 and/or by a PoB(s) 126(1)-(n), discussed further below.

To receive the events, the event generator(s) 120 can register with hooks or filters to receive notifications of the occurrence or non-occurrence of certain the events associated with objects or activities of interest. An event generator(s) 120 an also monitor locations in memory or log files, or spawn a thread to do so, observing events associated with the log files or memory locations. An event generator(s) 120 can observe multiple kinds of events, or each type of event may be associated with a different event generator 120. The events observed by the event generator(s) 120 may be specified by a configuration of the security agent 102.

In some examples, the behavior event generator(s) 112, upon generating event data (e.g., event notifications associated with objects or activities of interest, states of the computing device and/or correlator(s) 118, etc.), can route the event data at 122 to a filter/logic 124. In some examples the filter/logic 124 can be part of the accumulator 114. These observed events may include events associated with the creation or execution of objects (both "creation" and "execution" being referred to herein as "execution" of object(s)), which are routed to the filter. In some examples, events associated with the occurrence of activities and/or states of the computing device and/or a correlator 118 may also be routed to the filter/logic 124.

The events routed are referred to herein as event notifications. The event notifications and other observed events/event notifications/states (i.e., event data) may be routed via an event bus (not illustrated), which may form part of the filter/logic 124 or be a separate component. The event bus may route event data between the components of the security agent 102. In some examples, the accumulator 114 is a component to which the filter/logic 124 delivers event data that corresponds to at least part of a PoB 126 (n).

In some examples, the PoB(s) 126(1)-(n) used by the filter/logic 124 are the same as the PoB(s) 128(1)-(o) of the matching system 116. In other examples, the PoB(s) 126 (1)-(n) used by the filter/logic 124 are an alternate representation of the PoB(s) 128(1)-(o) of the matching system. In that example, the PoB(s) 126(1)-(n) can be specifically configured to recognize data in the form of event notifications, correlator states, etc., whereas the PoB(s) 128(1)-(o) of the matching system 116 can be configured as regular expressions. Regardless of the form, in this example, each PoB 126(n) used by the filter/logic 124 corresponds to a PoB 128(o) of the matching system 116. Note that "PoB," as used herein, refers to a canonic series of behaviors that has had a portion of the series removed to be parameterized (turned into values of a definition) and has had those portions replaced with fields to be populated with values from a definition 130(p).

For example, a PoB 128(o) could be a regular expression that has unpopulated portions (fields) that are populated by a definition from a definition repository that corresponds to that PoB 128(o) (i.e., definition repository 110(o)). In this example, the definition repository 110(o) can be compiled at the remote security service 104 or in user space of the monitored computing device and provided to the security agent 102. In an alternate or additional example, the PoB 128(o) and definitions of the definition repository 110(o) are pre-compiled together as distinct regular expressions (whereas, in the first example one regular expression receives values from the definition repository 110(o)). In this example, the regular expressions can be compiled at the remote security service 104 or in user space of the monitored computing device and provided to the security agent 102.

For example, a description of a series of behavior observed by the security agent could include the following string: "process.created.from:C:\Windows\; process.imagename:winlogon.exe; parent.calls.child.from: C:\Windows\System32\; child.imagename:cmd.exe". A PoB could be a regular expression that returns a match for "process. created. from:.*; process.imagename:.*; parent. calls. child. from:.*; child.imagename:.*", where ".*" is a regular expression that allows any value. Note that ".*" is an example of a "field" or "empty field," as it is also referred to herein, of a pattern of behavior. In some examples, upon receiving event data, the filter/logic 124 can determine that the event data corresponds with at least part of a PoB 126(n).

For example, a PoB 126(n) could specify that a parent process is created that calls a child process (e.g., "process-.created.from:.*; process.imagename:.*; parent.calls.child. from:.*; child.imagename:.*"). In this example, the filter/logic 124 could determine that an event generated by the behavior event generator(s) 112 that indicates that a process was created could correspond to at least the parent process portion of the PoB 126(n) (e.g., "process.created.from:.*" and/or "process.imagename:.*"). Based on a determination that at least a portion of the event data corresponds to at least a portion of at least one PoB 126, the filter/logic 122 can route the event data or a portion thereof to the accumulator 114 (e.g., via the event bus).

In some examples, the accumulator 114 stores at least a portion of received event data in a test pattern 128. For example, the accumulator 114 can create the test pattern by populating fields of a PoB 126 with corresponding observed values derived from event data routed from the filter/logic 124. For example, for the example PoB discussed above and a received event data that specifies that a process was just created from the location "C:\Windows\", the accumulator 114 could populate the corresponding field of the example PoB as follows: "process. created. from: C:\Windows\; process.imagename:.*; parent.calls.child.from:.*; child.imagename:.*". In an additional or alternate example, the accumulator 114 can be configured to agnostically describe received event data in a high level language that the matching system is configured to match over (e.g., without using a PoB 126(n) to create the test pattern 128). For example, the accumulator 114 can create a behavior description, such as a string, associated with event data (e.g., "process.created-.from:C:\Windows\"), add a known delimiter (e.g., ";"), and concatenate the behavior descriptions relevant to a PoB 126

(e.g., process. created. from: C:\Windows\; process.imagename:winlogon.exe; parent. calls. child. from: C:\Windows\System32\; child.imagename:cmd.exe").

In some examples, once all the fields of a PoB 126(*n*) are populated, the accumulator 114 can trigger 132 the matching system 116 to attempt to match the test pattern 128 to a PoB 126(*n*) with its field(s) populated by value(s) specified by a definition 130(*p*) from the corresponding definition repository 110. In some implementations, an individual PoB 126(*o*) can correspond to a definition repository 110(*o*), which stores definitions 130(1)-(*p*) having value(s) that correspond to the fields of the PoB 126(*o*). In other words, in some examples, each definition repository 110 can store definitions for a corresponding PoB 126. In some examples, the matching system 116 can include a regular expression that returns a match for a PoB 126(*o*) with its field(s) populated with corresponding value(s) from a definition 130(*p*).

In some examples, the matching system 116 is configured with a regular expression that can evaluate whether a match exists for the PoB 126(*n*) and a plurality of definitions 130(1)-(*p*), in a single computational pass. In some examples, the plurality of definitions 130(1)-(*p*) can be compiled into a single file such as, for example, a deterministic finite automaton (DFA) image. This allows the matching system 116 to determine whether a match exists for a test pattern once, instead of making that determination for each definition that exists for a PoB. For example, an individual state of the DFA can be configured by a union a definition 130(1) and PoB 126(1).

In some examples, the PoB can be a configuration of the matching system that provides multi-pattern matching and/or multi-classifying. For example, as a multi-pattern matching system, the PoB can be a regular expression that has an empty field that, when populated with a value specified by a definition 130(*p*), indicates a match for behavior descriptions that correspond to a same pattern of behavior and value. In this example, the combination (i.e., union) of the PoB and the value is itself a regular expression. In some examples, the matching system 116 includes the definition repository 110. In some examples, the matching system 116 includes a set of regular expressions, each of which corresponds to a different definition (i.e., a union of a PoB and value(s) of a definition). This system is "multi-pattern" in that the system can determine whether a behavior description matches any of a plurality of behaviors by alternately testing whether the behavior description matches the pattern of behavior with its field alternately populated by a value specified by one of a plurality of definitions.

For example, the regular expression could determine whether a test pattern, "parent. calls. child. from: C:\Windows\System32\; child.imagename:cmd.exe" matches a first union of a PoB "parent.calls.child.from:.*; child.imagename:.*" and the values "C:\Program Files\Microsoft Office\" and "trojan.exe" supplied by a first definition (i.e., the first union thereby being "parent.calls.child.from: C:\ ProgramFiles\Microsoft Office\; child.imagename:trojan.exe", which is not a match), a second union of the same PoB and the values "C:\Windows\System32\" and "cmd.exe" supplied by a second definition (i.e., the second union thereby being "parent.calls.child.from: C:\Windows\System32\; child.imagename:cmd.exe", which is a match), or unions for as many definitions as may exist for the PoB or for as many definitions as it takes before identifying a match.

FIG. 1 illustrates one or more PoB(s) 128(1)-(*o*). The first PoB 128(1) has between 1 and Q number of fields (fields 128(1).134(1)-(*q*)) and the example O-th PoB 128(*o*) has one field to use as an example (128(*o*).134(1)). In some examples, each PoB can have a definition repository 110 associated with it (e.g., definition repository 110(*o*)). In this example, the values of the definition repository 110 correspond with a variety of series of behavior to which a test pattern 128 can be matched. In this example, two definitions are shown in the definition repository 110(*o*) that corresponds with the PoB 128(*o*). Although definitions can specify one or more values (the number of which corresponds to the number of empty fields specified by the corresponding PoB), for this example, definition 114(1) specifies a single value 134(1) and definition 114(*p*) specifies a single value 134(*p*) since PoB 128(*o*) has one empty field.

In some examples, definition(s) 130(1)-(*p*) can include value(s) 134(1)-(*p*) that corresponds to a field specified by a PoB and one or more of a behavior identifier 136 and/or a disposition 138. If a test pattern 128 matches a union of a PoB and corresponding value(s) (e.g., a regular expression that returns a match for the PoB with the corresponding value(s) populating the PoB), such as PoB 128(*o*) and value 134(*p*), the matching system 116 can emit 140 definition data, such as one or more of the behavior identifier 136 and/or the disposition 138 associated with the definition to which the test pattern matched. In some examples, the disposition 138 is a configuration of the security agent 102 that, upon receiving an emitted behavior identifier 136, takes the action specified by the disposition 138.

In some examples, the value(s) 134(1)-(*p*) can be any characteristics that can be parameterized due to variations in the characteristic. For example, the value(s) 134(1)-(*p*) can include object names, file locations, on object type, an activity type, time lapsed between activities, timestamp information, whether a thread is active, processes associated, a state of a process or changes in the state of a process (e.g., whether a browser has browsed to another page), a location in memory or a pointer thereto (e.g., a stack pointer), an order of any such activities, a count, credentials of a logon session, identifiers of parent and grandparent processes, etc. In some examples, a count can be a threshold number of times that a behavior is observed (e.g., a count of a number of types of data files that are being accessed and/or a frequency of access of files, in the case of ransomware, for example). Particular combinations of these values can be associated with a PoB and behavior identifier 134 (e.g., values that specify a compromised set of credentials and a directory, a PoB that a remote procedure call and empty fields for the credentials and directory, and a behavior identifier that identifies this union as being "high confidence malicious remote procedure call").

In some examples, the behavior identifier 136 associated with a definition 130(*p*) can provide a characterization of the union of the PoB and the value(s) 134(*p*) of the definition 130(*p*) (e.g., "high confidence ransomware," "medium confidence server threat," "low confidence server threat," "no match"); and the disposition 138 can specify an action for the security agent to initiate. In some examples, the behavior identifier 136 can be used an instruction set configured to operate a correlator of the correlator(s) 118 that can correlate observed behavior using the definition data. In some examples, the behavior identifier 136 can include an identifier of an activity as being benign or malicious and/or software associated with the activity as being benign or malicious (i.e., malware).

In some examples, an action specified by the disposition 138 includes one or more of no operation (i.e., whitelist), communicating a notification via a communications interface to a remote security service 104, communicating the notification (e.g., including definition data 140 and/or the test pattern 128) via the communications interface to the remote security service 104 and to a user interface associated with the security agent, stopping execution of an object associated with the test pattern 128, preventing an action related to the test pattern 128, quarantining a file associated with the test pattern 128, tagging the definition 130(*p*) as being a false positive, or shutting down a one or more of a current or an attempted network connection of the monitored computing device. In some examples, the security agent 102 can shut down all current and/or attempted network connections of the monitored computing service except one or more network connections specified by a quarantine policy of the remote security service 104. In some examples, the exceptions specified by the quarantine policy can include the remote security service 104 and/or an administrator device or service of a network to which the monitored computing device belongs. In some examples, upon determining that there is no match, the security agent 102 takes no further action.

For example,
1. the pattern of behavior could be a description in a high level language of a parent process calling a child process;
2. the PoB could have four fields: parent command line, parent image file name, child command line, and child image file name;
3. the definition could include four values that correspond to the four fields of the PoB that specify:
   "winlogon.exe",
   "C:\Windows\System32\winlogon.exe",
   "cmd.exe",
   "C:\Users\JohnDoe\AppData\Roaming\Microsoft\Windows\Start Menu\Programs\System Tools\cmd.exe";
4. the definition could include a behavior identifier that indicates that the union of these values with the pattern of behavior specified by the PoB (i.e., a parent named "winlogon.exe" having an image file location as specified above calls a child process "cmd.exe" having an image file location as specified above) is "medium confidence winlogon threat;" and
5. the definition could also include a disposition that specifies the action "stop process and send notification to host system user interface."

In some examples, the matching system 116 can be a multi-classification system by grouping unions of a PoB 128(*o*) and value(s) specified by different definitions into clusters where each cluster of value(s) is associated with a behavior identifier 136 and/or a tag. For example, a union of a PoB 128(*o*) and value(s) specified by a particular definition can be a regular expression that returns a match for the PoB 128(*o*) if its field(s) are filled by value(s) specified by the definition. In an example where such regular expressions are used, the regular expressions can be grouped into clusters where each cluster is associated with a different tag or class. In this way, to identify whether the test pattern 128 is associated with a particular tag (e.g., "ransomware", "malicious behavior," "benign activity"), only one regular expression needs to return a match. In some examples, it isn't necessary for the matching system 116 to find multiple matches—the matching system 116 can emit definition data (e.g., one or more of the behavior identifier 136 or disposition 138) as soon as a match is found. In some examples, n number of a first group of definitions can be associated with a first behavior identifier and m number of a second group of definitions can be associated with a second behavior identifier. In some examples, no definitions of the first group overlap are definitions of the second group (i.e., the groups are disjoint).

In some examples, upon detecting a match, the matching system 116 can emit definition data 140 to a portion of the security agent 102 that handles an action specified by the disposition 138. In some examples, the emitted definition data 140 can be used to populate a PoB that includes a field that specifies a behavior identifier and/or disposition to create a second test pattern. In some examples, definition data can be emitted 140 to a correlator of the correlator(s) 118 in order to increase a confidence in classifying behavior on the computing device. In some examples, definition data and/or the test pattern 128 can be emitted 140 to a remote security service 104 and/or one or more other security agent(s) 108.

For example, if the matching system 116 does not recognize (i.e., find a match) the test pattern 128, has a low confidence of what the behavior is and a correlator is unable to increase that confidence, or otherwise has a tag or some indicia that incites the security agent 102, the security agent 102 can emit the definition data and/or the test pattern 128 to a remote security service 104 for analysis by a remote operator. In some examples, the matching system 116 can detect that the test pattern 128 matches a PoB but no definition can be found that has values that match the values of the test pattern 128. In this example, the security agent can provide one or more of the test pattern 128, the PoB, or or the unmatched values to the remote security service 104.

In some examples, a remote operator, upon receiving the test pattern 128, the PoB, and/or the unmatched values (i.e., the unrecognized behavioral pattern), can supply an indication of one or more of a behavior identifier, and/or a disposition to assign to the values of the unrecognized behavioral pattern. In some examples, the operator-supplied indication can be a selection of an item presented in a list format or a field presented to the remote operator. For example, as soon as the remote operator assigns one or more of a behavior identifier, and/or a disposition to the behavioral pattern received from the security agent 102, remote security service 104 can compile that information as a new definition for transmission to the definition repository 110. This new definition updates the policy of the security agent 102 without modifying the hard-coded configuration of the security agent 102 and can be accomplished as soon as the remote operator selects or upon confirmation by the remote operator that the new definition should be compiled and transmitted.

In another example, the remote operator can push a new or modified definition to the security agent 102 without the security agent provoking the interaction. For example, this could be the case when the security agent 102 has not yet observed a series of behavior and the remote operator is prospectively equipping the security agent to be able to recognize and handle the series of behavior.

In some examples, the remote security service 104 can provide the option to view what previously observed behaviors within a defined time would be implicated by the new or modified definition and/or what the effect of the newly defined or modified definition would have on security agent actions. For example, a remote operator could request to review what effect assigning a behavior identifier or disposition would have on observed behavior in the last hour. If a behavior identifier was assigned to a series of behavior as being "high confidence ransomware" and a disposition of "stop process," the remote operator could see how many and which processes would have been stopped in the last hour. This can be particularly useful for setting thresholds that may identify false positives (e.g., particularly for malware where count and/or frequency thresholds can be implemented in an attempt to identify malware).

Dynamic Security Agent Policies/Correlator Using Matching System

In some examples, the behavior identifier 136 can be used to operate dynamic policies (i.e., soft-coding behavior of the security agent in response to observed computing device behavior) configured as a dynamic correlator of the correlator(s) 118. In some examples, the behavior identifier 136 is the only definition data emitted and the security agent 102 is configured to initiate actions and operate a correlator of the correlator(s) 118 based on well-defined behavior identifiers. In this example, the behavior identifiers identify some abstract but human-intelligible behavior. Some behaviors can be considered malicious; some can be considered indicators or aspects of potentially malicious behaviors. These latter behaviors usually require further correlation with subsequent events that meet some conditions to result in confident determination of some malicious behavior.

Behavior identifiers are not "well known" to the sensor and can simply be arbitrary integers with respect to sensor functionality. Therefore, new series of behaviors can be defined by new definitions without needing to update a configuration of the matching system 116 to recognize new behavior identifiers. In this example, it is the conditional evaluation of behavior identifiers by pattern (or definition) logic on the security agent 102 that imbues behavior identifiers with any semantic meaning. In this example, behavior identifiers can function like a variable in a traditional program of a functional programming language program. That is, without the context of the program, a variable loses any meaning except for its value. And since functional programs draw little distinction between data and code, behavior identifiers can also perform a role somewhat like functions or instructions.

This example results in the ability to define a policy of security agent behavior dynamically via a new definition without any changes to a configuration of the security agent 102 (as opposed to another example where the configuration of the security agent 102 is hard-coded), such that a match with the new definition emits a new behavior identifier. This example can be implemented by allowing a definition to be created for every event generated by the behavior event generator(s) 112, either via manual definition in the configuration of the security agent 102, or by having a compiler toolchain of the configuration automatically generate a definition for every defined event, or by a third option between those two extremes, which would allow manual specification of event types for which the compiler should automatically generate definitions.

In this example, the security agent 102 can add tags to objects such as processes or modules. In some examples, a tag is a piece of information that indicates a logical predicate. For example, a tag named, in plain language, "IsBrowser" when applied to a module or process indicates that the module or process is a browser. In some examples, tags can be a well-known (i.e., a defined) integer. That example illustrates that the term "classifying" is logically synonymous with applying the predicate. In some examples, tagging involves two pieces of information, an object that should be tagged and the tag that should be applied to the object. In some examples, the matching system 116 emits one of these pieces of information in the emission of a behavior identifier 136—the "target process" is either the process that is exhibiting some behavior, or the process that is having some behavior done to it. So the target process is either the "subject" or the "object" of the behavior, and whether the process is one or the other depends on the meaning of the behavior identifier.

So, in some examples, the security agent 102 can allow dynamically defined behavior identifiers of newly-defined definitions to tag processes in the following way. First, allocate a behavior ID whose meaning is "tag process X with fixed tag <tagname>", where X is the target process of a behavior identifier emission, and <tagname> is a fixed tag. Then a well-known behavior identifier (B) is allocated to be semantically associated with tag <tagname>. Finally, a policy can be created in the static configuration of the matching system 116 that causes a tag to be created for the target process whenever behavior identifier B is emitted.

This example technique for the definition of the tag and the definition of the policy described above are both static configuration (i.e., hard-coded at design time) constraints and so, cannot be defined dynamically. However, for any such policy/tag pairs that are defined in the system in that manner, they can be used to dynamically cause tagging to occur on the basis of new dynamic PoBs. For example, a tag/policy pair that allows a process to be classified as a browser can be exercised by a new dynamic policy defined from the remote security service 104 that expresses a new way to classify a browser, for example (perhaps a new browser introduced to the market for example).

In another example, dynamic definitions and/or PoBs can be used to implement a dynamic correlator. Generally speaking, correlators are state machines whose transitions are conditioned upon observation of certain events, and certain Boolean combinations of those events—in other words the transitions are conditioned upon a Boolean filtering of the observed event stream. In some examples, the dynamic correlator mechanism described herein can include the following capabilities and characteristics: dynamic policies that emit unique behavior identifiers, a set of behavior identifiers that act as simple "instructions" for a correlator, a dynamic mechanism for querying current correlator state, a dynamic mechanism for determining concurrent correlator state and behavior emission. In some examples, this allows the dynamic correlator to dynamically create new correlators, query correlator state, increment correlator state up to a maximum value, decrement correlator state, set/reset timers, and/or reset correlator state to 0.

For example, the behavior identifiers could include the following well-defined identifiers:

| Example Behavior Identifier | Meaning |
| --- | --- |
| 1000 | Create new dynamic correlator instance |
| 1001 | Emit a utility CorrelatorStateQuery event with TimerValue undefined |
| 1002 | Increment correlator state |
| 1003 | Reset correlator state to 0 |
| 1010 | Emit a utility CorrelatorStateQuery event with TimerValue set to 1 second |
| 1011 | Emit a utility CorrelatorStateQuery event with TimerValue set to 5 seconds |
| 1012 | Emit a utility CorrelatorStateQuery event with TimerValue set to 10 seconds |
| 1013 | Emit a utility CorrelatorStateQuery event with TimerValue set to 30 seconds |
| 1014 | Emit a utility CorrelatorStateQuery event with TimerValue set to 60 seconds |

In some examples, the definition could include the following behavior identifier(s) 136 (e.g., implemented in the security agent 102 as behavior events):

| Name | Description | Fields |
| --- | --- | --- |
| InitializeDynamicCorrelator | Creates a new dynamic correlator instance | TargetProcessId<br>InputBehaviorId<br>DynamicCorrelatorBehaviorId |
| CorrelatorStateQuery | Queries the state of the correlator | TargetProcessId<br>InputBehaviorId<br>DynamicCorrelatorBehaviorId<br>State |
| CorrelatorStateResponse | Informs dynamic policies of the current state of the DynamicCorrelationCorrelator | TargetProcessId<br>InputBehaviorId<br>DynamicCorrelatorBehaviorId<br>State |

In some examples, the security agent 102 could include a main dynamic correlator, "DynamicCorrelationCorrelator," to provide general correlation functionality for all dynamic correlators. In some examples, this correlator could be indexed by BehaviorId and TargetProcessId fields which are present in the IdentifyBehavior events that can drive this main dynamic correlator.

Static correlators have identifiers associated with them to keep correlation logic from interfering with other correlation. In some examples, the dynamic correlators can use InitializeDynamicCorrelator to identify each dynamic correlator and prevent the same issue. In some examples, the identifier allocated by InitializeDynamicCorrelator is used consistently throughout the process without varying and can be a taxonomically allocated behavior identifier that is reserved for the purpose of identifying a dynamic correlator. In this example, IdentifyBehavior events can be used to properly identify behavior (in part, in some examples, y having a limited set of fields) so that the correct correlator is identified.

In some examples, a dynamic correlator can be implemented as follows.

1. Correlator-initializing dynamic policy. An initial dynamic policy can be defined using a PoB with an empty field, InitialBehavior, which is the first behavior of interest that is intended to start the correlation. Note that this is an example of a PoB that takes a behavior identifier as an input, whereas other PoBs may take event data as an input or some combination thereof. A corresponding definition can include behavior identifiers defined in a way such that the matching system 116 emits an InitializeDynamicCorrelator event which rolls up fields TargetProcessId (defined in PoB) and DynamicCorrelatorBehaviorId (taken from the dynamic policy's IdentifyBehavior identifier field in the PoB). In some examples, DynamicCorrelatorBehaviorId is specified in a definition as the behavior identifier to be emitted by the policy template instance. In some examples, all subsequent dynamic policies (i.e., PoBs and/or definitions associated therewith) associated with this dynamic correlation must specify and match this identifier.

2. Upon emission of a InitializeDynamicCorrelator event by the matching syste 116, DynamicCorrelationCorrelator, which is indexed by the DynamicCorrelatorBehaviorId and TargetProcessId fields, can create a correlator instance in state 1. The state of this correlator instance can later be queried by other dynamic policies (e.g., PoBs and/or definitions) associated with the dynamic correlator.

3. In some examples, for each pair (DynamicCorrelatorBehaviorId, state-of-interest, event-of-interest), a new PoB is instantiated based on a PoB that takes DynamicCorrelatorBehaviorId and BehaviorId as its parameters. When the definition is matched, the matching system 116 emits a CorrelatorStateQuery event with DynamicCorrelatorBehaviorId used to uniquely identify the dynamic correlator and, InputBehaviorId=event-of-interest, State=state-of-interest, and TargetProcessId=TargetProcessId.

4. In some examples, the DynamicCorrelationCorrelator consumes CorrelatorStateQuery events. For each event that matches its index based on DynamicCorrelatorBehaviorId and TargetProcessId, the correlator logic can check to see if the CorrelatorStateQuery event's State field matches the correlator instance's current state. If so, the correlator emits a CorrelatorStateResponse event with the same fields.

5. A dynamic policy is instantiated as a PoB based on a template that consumes CorrelatorStateQuery events with the parameters InputBehaviorId, DynamicCorrelatorBehaviorId, and State. In some examples, the values for this template instantiation must match those specified in (3) above. This instantiation rolls up one of the following:

IdentifyBehavior(Id=1002), which causes DynamicCorrelationCorrelator to increment its state value, or
   IdentifyBehavior (final correlated behavior ID)

Thereby, the correlator can consume two or more events defined dynamically from the remote security service 104 using three or more dynamic policies. In general, the number of dynamic policies needed will be 1+2(N−1), where N is the number of events to be correlated by the dynamic correlator.

The description above shows the basic outline of how dynamic correlations can be constructed out of the static configuration of the security agent 102 and the matching system 116 mechanism. In some examples, one important aspect of correlator development is managing correlator instance lifetimes. Many correlators use timers to bound instance lifetime in an attempt to control the number of outstanding correlator instances. In some examples, timers are also used to distinguish related from unrelated operations, requiring, for example, that an I/O "file write" operation occur within 1 second of a "file read" operation, in order to infer that those operations are likely to comprise part of a file copy operation.

In the behavior identifier/instruction table above, several timer instructions are defined, allowing dynamic policies to set or reset timers. In some examples, the CorrelatorStateQuery event contains an optional TimerValue field that, when specified, may cause the dynamic correlator to reset its timer. When the conditions are met in this exaple where the DynamicCorrelationCorrelator would emit a CorrelatorStateResponse, and if the input CorrelatorStateQuery event specifies one of a number of pre-defined TimerValue values, then the correlator's timer is reset to the specified value. A dynamic policy can then choose whether to set/reset a dynamic correlator's timer, and to what value it should be reset by choosing to emit a behavior identifier among behaviors 1001, 1010-1014 upon any state transition. In some examples, this schema can be extended so that the behavior identifier/instruction pair does not increment or decrement a state and, instead, resets the correlator time.

In some examples, the dynamic correlator discussed herein can provide a large subset of static correlator functionality to provide operations that query, increment, and decrement accumulator values for a given instance.

In some cases, an issue may arise in implementing a dynamic correlator with ordering evaluation of the dynamic policies that generate dynamic correlators. In some examples, one or more of several mechanisms can be implemented to control dynamic policy evaluation order:

In some examples, instances can be ordered within a definition and/or a PoB. These instances can be evaluated at runtime in the order that they are ranked in the PoB. In some examples, after initiation of a dynamic correlator instance, subsequent dynamic policies can specify to which correlator state they pertain, which can be used to control ordering. For example, a policy that pertains to "state 2" can be evaluated before a policy that pertains to "state 3."

In some examples, within a given state, dynamic policy evaluation order can be controlled based on the behavior identifiers consumed and emitted by each. For example, if three policies are intended to (a) increment the dynamic policy accumulator, (b) reset the dynamic policy timer, and (c) transition the dynamic correlator to the next state, policy (a) can emit behavior X which is consumed by policy (b), which emits behavior (X+1) which is consumed by policy (c), which emits behavior 1002, which finally causes the correlator's state to increment.

Example Scenario

FIGS. 2A and 2B illustrates an example scenario of the techniques discussed herein that includes a process and components produced by that process. This process illustrates both operations of a computing device and logic/data structures that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Note that, although the examples given in the illustration and discussed herein use plain language and mock-up representations of data structure fields and values, it is understood that any portion of this can alternately be represented by integer values and/or a programming language of the security agent.

FIGS. 2A and 2B depict an example scenario that includes observing, by a security agent such as security agent 102, a series of behavior on a computing device and ultimately, responding to the observed behavior by emitting a behavior identifier and/or a disposition. This example scenario is a scenario where the series of behavior observed matches a definition.

At 200, a security agent implemented on a monitored computing device receives behavior data generated by a module of the security agent. For the sake of comprehension, an example of this corpus of behavioral data is described by the text depicted in the series of behavior 202.

At 204, if there is not a PoB that corresponds to the series of behavior 204, the series of behavior can be transmitted to a remote security service, where an application at the remote security service can provide an interface for a remote operator to specify portions of the series of behavior 202 to parameterize. The portions indicated can be used to parameterize the series of behavior 202, forming the illustrated PoB 206. In this example, the process name, "gpg.exe," the number of instances of that process, and a number of file types accessed in the last minute were all parameterized by the values corresponding to the parameters being removed to form the PoB 206. In the illustration, these portions are underlined and have a field name associated with each of the parameter fields (i.e., process.name, instance.count, file.access.count).

Once the parameter values have been extracted and the PoB 206 thereby formed, a regular expression can be generated that would match the PoB 206 with wildcard expressions (e.g., ".*") in the place of the parameter fields. This regular expression can be used as a configuration for the matching system of the security agent.

Moreover, once the parameter values are extracted, in some examples, the parameter values can be the default values of the corresponding definition 208. However, this example illustrates an example where the techniques permit the ability to specify values that differ from the values observed at 200. For example, the value corresponding to the field, "process.name", was allowed to remain the same (i.e., gpg.exe), but the remote operator changed the values of "instance.count" and "file.access.count."

This might be necessary, as in this case, because the observed values might not be sufficient to detect threats or may induce false positives. For example, the union of the PoB 206 and definition 208 describe an instance of ransomware. Allowing a threshold count of the number of file types accessed by a computing device within the last minute to remain at "22", as observed in this example, before detecting that a series of behavior is associated with ransomware is likely much too high since it is uncommon for an object to access more than one or two file types, with certain specific exceptions. Therefore, the remote security service can provide an option to specify a value when the definition 208 is being created or modified.

Alternately, if the PoB 206 existed at the time the series of behavior was observed, the process can proceed to 210 where an accumulator can take the incoming observed behavioral data and input the relevant portions of the behavioral data into a test pattern 212 that corresponds to the PoB 206, in one example. At 210, once the test pattern 212 is complete (e.g., by populating each of the field of the PoB 206), the matching system can compare the test pattern 212 to unions of PoB 206 and value(s) of definition(s) from the definition repository. In some examples, a union 214 of a PoB 206 and value(s) of a definition 210 is a regular expression with field(s) populated by the value(s) of the definition 210 (a "fill-in-the-blank" schema). In this example, the matching system would proceed through populating the PoB 206 with values from various definitions until coming upon values that match the test pattern 212 such as the values of definition 208. In alternate or additional examples, the union 214 of a PoB 206 and value(s) of a definition 210 can be a pre-generated regular expression ("fixed" schema where a regular expression exists for every PoB/definition pair). Regardless of the manner of generating the union, the matching system can compare the test pattern 212 with a union 214 of the PoB 206 and value(s) of definitions to see whether there is a union (describing a series of a behavior) that matches.

The illustrated example demonstrates that the regular expression generated for a PoB such as PoB 206 does not have to include only literal search terms (e.g., the regular expression can return a match for file type access counts for numbers equal to or greater than 5, not just 5). The operators chosen for the regular expression generated can depend on the type of values, the type of malware, and/or an observed effect of the definition values (e.g., by presenting an anticipated impact by reviewing historical data and how the computing device would be affected by implementing the definition).

If a match is identified, the process can proceed to 216. At 216, since the test pattern 212 and the union 214 match, the matching system can emit definition data 218, such as the behavior identifier 218(1) and/or the disposition 218(2). In this example, the behavior identifier identifies the union of the PoB 206 and the values of definition 208 (which describes the series of behavior 202 generally) as having a high likelihood of being ransomware. In some examples, if this behavior identifier indicated a lower confidence, the emission could be sent to a remote security service 104 and/or a correlator of the correlator(s) 118. In this example, the emitted definition data 218 also includes a disposition 218(2) that includes stopping all instances of gpg.exe and sending a notification to a user interface of the remote security service.

In some examples, if a match is not identified, the test pattern 212 can be transmitted to the remote security service for a new or modified definition to be compiled and transmitted to the security agent so that the security agent can recognize and handling the behavior described by the test pattern 212.

Example System

FIG. 3 illustrates a component level view of a computing device configured with a security agent according to the techniques discussed herein. As illustrated, computing device 300 comprises a system memory 302 storing objects (d) 304 targeted by exploits 306 and a security agent 308 that includes a behavior event generator(s) 310, accumulator 312, matching system 314, and PoB(s) 316. Also, computing device 300 includes processor(s) 318, a removable storage 320 and non-removable storage 322, input device(s) 324, output device(s) 326 and communication connections 328 (i.e., a communications interface) for communicating with other computing devices 330.

In various embodiments, system memory 302 is volatile (such as RAM), non-volatile (such as ROM, flash memory, etc.) or some combination of the two. The object 304 may be any sort of object, such as an process or thread that is compromised by a security exploit 306. The security agent 308 and its behavior event generator(s) 310, accumulator 312, matching system 314, and PoB(s) 316 are also examples of similarly named components further describe herein.

In some embodiments, the processor(s) 318 is a central processing unit (CPU), a graphics processing unit (GPU), or both CPU and GPU, or other processing unit or component known in the art.

Computing device 300 also includes additional data storage devices (removable and/or non-removable) such as, for example, magnetic disks, optical disks, or tape. Such additional storage is illustrated in FIG. 3 by removable storage 320 and non-removable storage 322. Non-transitory computer-readable media may include volatile and nonvolatile, removable and non-removable media implemented in any method or technology for storage of information, such as computer readable instructions, data structures, program modules, or other data. System memory 302, removable storage 320 and non-removable storage 322 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 300. Any such non-transitory computer-readable media may be part of the computing device 300.

Computing device 300 also has input device(s) 324, such as a keyboard, a mouse, a touch-sensitive display, voice input device, etc., and output device(s) 326 such as a display, speakers, a printer, etc. These devices are well known in the art and need not be discussed at length here.

Computing device 300 also contains communication connections 328 that allow the computing device 300 to communicate with other computing devices 330, such as the remote security service 104 and/or the security agent(s) 108(1)-(m).

In some examples, the computing device 300 can also have a definition repository 330 for storing definition(s) in the system memory 302. In some examples, the security agent 308 can otherwise have access to a remotely stored definition repository 330 via the removable storage 320, non-removable storage 322, and/or the communications connection(s) 328.

Example Processes

Figure 4:
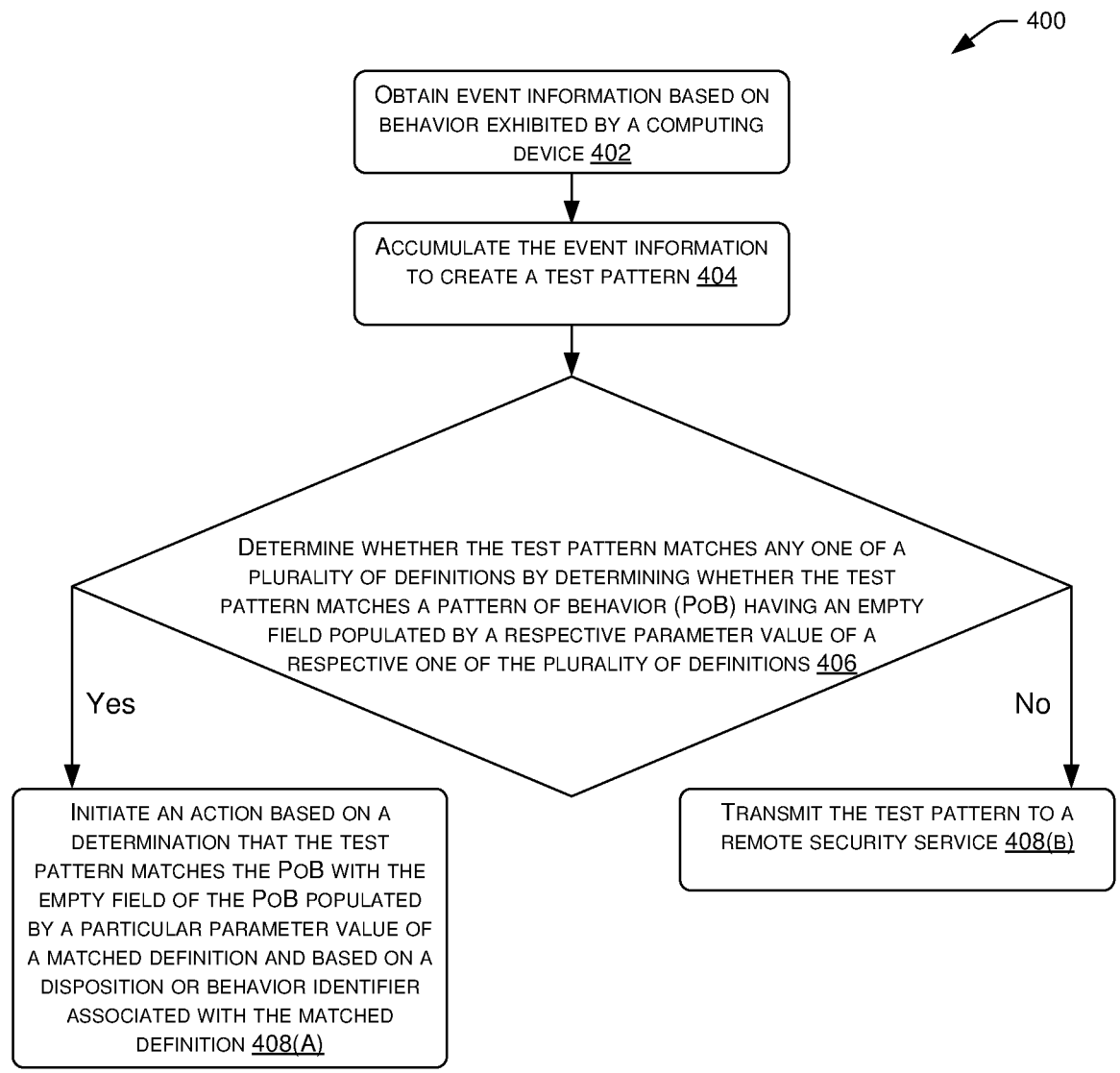
FIG. 4 illustrates an example process for recognizing and handling, by a security agent, behavior exhibited by a computing device and observed by the security agent.
Figure 5:
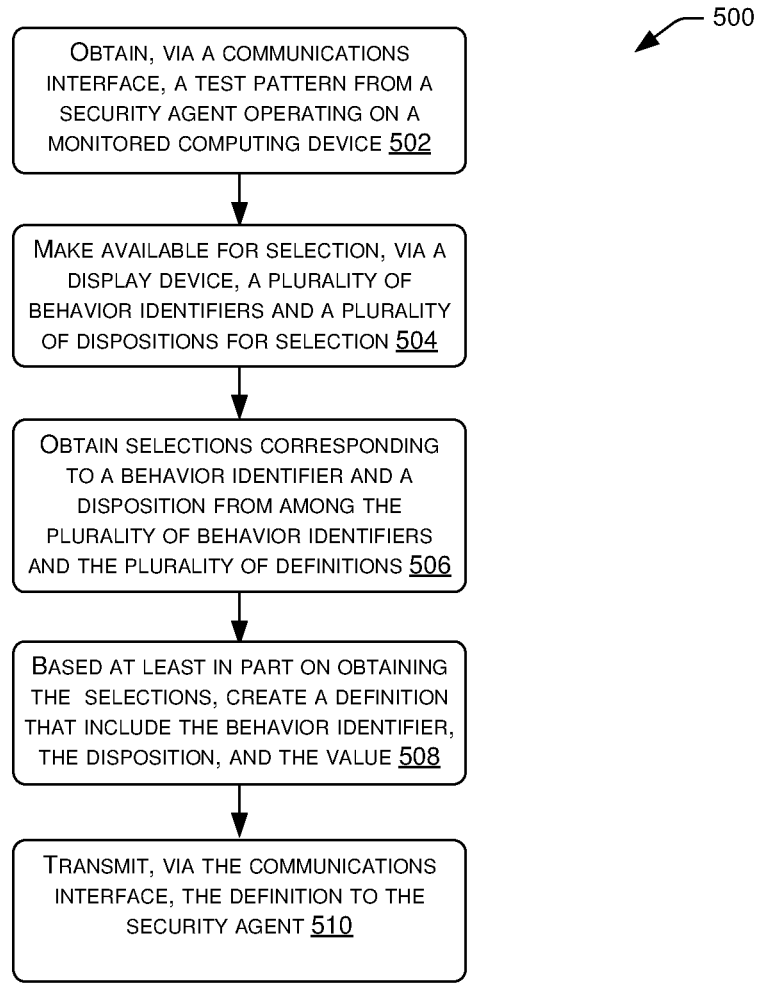
FIG. 5 illustrates an example process for receiving a test pattern from a security agent at a remote security service and creating a definition to transmit to the security agent so that it can recognize and handle the behavior underlying the test pattern.

FIGS. 4 and 5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for recognizing and handling, by a security agent, behavior exhibited by a computing device and observed by the security agent.

Process 400 includes, at 402, the security agent obtaining event information based on behavior exhibited by a computing device and observed by the security agent, per any of the techniques discussed herein. In some examples, the obtaining can be based on a configurable policy of the security agent. At 404, the security agent can accumulate the event information to create a test pattern, per any of the techniques discussed herein.

At 406, the security agent can determine whether the test pattern matches any one of a plurality of definitions by determining whether the test pattern matches a (PoB) having an empty field populated by a respective parameter value of a respective one of the plurality of definitions, per any of the techniques discussed herein.

At 408(*a*), if a match is found for a certain definition, the security agent can initiate an action based on a determination that the test pattern matches the PoB with the empty field of the PoB populated by a particular parameter value of a matched definition and based on a disposition or behavior identifier associated with the matched definition. At 408(*b*), if a match is not found, the security agent can transmit the est pattern to a remote security service.

FIG. 5 illustrates an example process for receiving a test pattern from a security agent at a remote security service and creating a definition to transmit to the security agent so that it can recognize and handle the behavior underlying the test pattern. In some examples, the monitored computing device, an administrator device in communication with the monitored computing device, or another device could conduct the operations of process 500 alternatively or in addition to the remote security service.

Process 500 includes, at 502, the remote security service obtaining, via a communications interface, a test pattern from a security agent operating on a monitored computing device, the test pattern including, per any of the techniques discussed herein.

At 504, the remote security service can make available for selection, via a display device of the remote security service, a plurality of behavior identifiers and a plurality of dispositions for selection. In some examples, this can include a field, list, series of check boxes, buttons, etc.

At 506, the remote security service can obtain selections corresponding to a behavior identifier and a disposition from among the plurality of behavior identifiers and the plurality of dispositions. In some examples, this can be as simple as receiving two clicks of a mouse. It is contemplated that any other suitable input can be used. In some examples, only a behavior identifier is selected. In some examples, any definition data discussed herein can be assigned to the value.

At 508, based at least in part on obtaining the selections, the remote security service can create a definition that includes the selected behavior identifier, the selected disposition, and the value. In some examples, this creating includes compiling the definition into a format for transmission to and use by the security agent.

At 510, the remote security service can transmit, via the communications interface, the definition to the security agent. In some examples, this operation can be accomplished automatically after receiving the selections of the behavior identifier and/or the disposition. In some examples, this operation can be completed after a review of the impact of the dissemination of the definition is completed (e.g., by displaying how many and which objects would be affected by the new definition and potential results at the monitored computing device) and/or a confirmation is obtained. In some examples, as soon as the definition is accessible to the security agent, the security agent is equipped to recognize and handle the behavior described by the union of the value and the PoB.

Example Clauses

A. A non-transitory computer-readable media having a security agent stored thereon: the security agent configured to be executed by a processor on a monitored computing device, the security agent including a pattern of behavior (PoB) that has an empty field, and the security agent having access to memory storing a definition that includes a parameter value corresponding to the empty field and a behavior identifier, the security agent further including: an accumulator executable by the processor to accumulate behavior information characterizing behavior exhibited by the monitored computing device into a test pattern, wherein the test pattern includes an observed pattern of behavior and an observed parameter value; and a matcher executable by the processor to: determine whether the test pattern matches a union of the PoB and the parameter value specified by the definition, and based on a determination that the test pattern matches the union, emit the behavior identifier.

B. The non-transitory computer readable media of paragraph A further including: an event collector that observes behaviors of the monitored computing device and generates event notifications based on the behaviors; and a policy that determines a subset of the event notifications to forward to the accumulator, wherein the event notifications include the behavior information.

C. The non-transitory computer readable media of either paragraph A or B, wherein: the matcher includes a regular expression that includes search terms determined by a union of the PoB and the parameter value of the definition; the PoB is part of a configuration file of the security agent; and the definition and the test pattern are stored in memory accessible to the security agent.

D. The non-transitory computer readable media of any one of paragraphs A-C, wherein: the empty field is a first empty field of a plurality of empty fields; the parameter value is a first parameter value of a plurality of parameter values specified by the definition, each individual parameter value of the plurality of parameter values corresponding to an individual one of the plurality of empty fields; the definition being a first definition of a plurality of definitions, each definition of the plurality of definitions specifying a pluralities of different parameter values; and the matcher executable by the processor to determine whether the test pattern matches any union of the PoB and parameter values specified by one of the plurality of definitions.

E. The non-transitory computer readable media of any one of paragraphs A-D, wherein the matcher determines whether the test pattern matches any union of the PoB and parameter values specified by one of the plurality of definitions in a single computational pass.

F. The non-transitory computer readable media of any one of paragraphs A-E, wherein: the behavior identifier identifies the union of the PoB and the parameter value as being associated with one or more of benign activity, malicious activity, benign software, or malicious malware, and the definition further includes a disposition that specifies an action to take responsive to matching the test pattern with the union of the PoB and the parameter value.

G. The non-transitory computer readable media of any one of paragraphs A-F, wherein the action specified by the disposition includes one or more of: no operation; communicating a notification via a communications interface to a remote security service; communicating the notification via the communications interface to the remote security service and to a user interface associated with the security agent; stopping execution of an object associated with the test pattern of behavior; preventing an action related to the test pattern; quarantining a file associated with the test pattern; tagging the definition as being a false positive; or shutting down one or more current or attempted network connections of the monitored computing device according to a quarantine policy.

H. The monitored computing device of any one of paragraphs A-G, wherein the definition is one of a set of definitions accessible to the matcher and the monitored computing device further including: a communications interface configured to receive a file including the plurality of definitions, the file being compiled at a remote security service and including a second definition specifying a second parameter value, a second behavior identifier, and a second disposition.

I. The non-transitory computer readable media of paragraph H, wherein the second definition configures the security agent to: recognize a second union of the pattern of behavior and the second parameter value by matching second behavior exhibited by the monitored computing device with the second union, and initiate an action specified by the second disposition based on observation of that behavior.

J. The non-transitory computer readable media of paragraph I, wherein: the set of definitions is a first set of definitions; the PoB is a first PoB associated with the first set of definitions; the empty field is a first empty field of a plurality of fields; and the security agent further includes a second PoB associated with a second set of definitions, the second PoB specifying a different pattern of behavior and a different empty field that corresponds to values specified by the second set of definitions.

K. The non-transitory computer readable media of any one of paragraphs A-J, wherein: the behavior identifier is a first behavior identifier; the definition is one of a first group of definitions corresponding to the PoB, each of which is associated with the first behavior identifier; and the security agent having access to memory storing a second group of definitions corresponding to the PoB, the second group of definitions being associated with a second behavior identifier and being disjoint from the first group.

L. A system comprising: a processor; a communications interface; a memory having stored thereon a security agent including a matcher that recognizes a pattern of behavior (PoB), the PoB including an empty field; the memory further having a first definition stored in a first definition file thereon, the first definition including a first value corresponding to the empty field; and wherein the security agent, when executed by the processor, configures the system to perform operations including: obtaining, via the communications interface, a second definition file including the first definition and a second definition that includes a second value corresponding to the empty field; obtaining behavior information regarding behavior exhibited by a computing device and corresponding to the pattern of behavior; accumulating the behavior information into a test pattern based at least in part on detecting that the behavior information corresponds with at least part of the pattern of behavior; and determining whether the test pattern matches a first union of the PoB with the empty field populated by the first value or a second union of the PoB with the empty field populated by the second value.

M. The system of paragraph L, wherein: the first definition further includes a first behavior identifier and a first disposition, the first behavior identifier indicating that the first union is malicious or benign; the second definition further includes a second behavior identifier and a second disposition, the second behavior identifier indicating that the second union is malicious or benign; and the operations further comprise: determining that the test pattern matches the first union, and based on determining that the test pattern matches the first union, emitting one or more of the first behavior identifier or the first disposition; or determining that the test pattern matches the second union, and based on determining that the test pattern matches the second union, emitting one or more of the second behavior identifier or the second disposition; or determining that the test pattern does not match either the first union or the second action, and based on determining that the test pattern does not match either the first union or the second union, transmitting at least part of the test pattern via the communications interface to a remote security service or taking no further action.

N. The system of either paragraph L or M, wherein determining whether the test pattern matches the first union or the second union is conducted in a single computational pass.

O. The system of any one of paragraphs L-N, wherein: the empty field is a first empty field; the PoB is a first PoB that is one of a plurality of PoBs that include a second PoB; the first definition and the second definition are associated with the first PoB; and the second PoB specifies a second empty field.

P. The system of any one of paragraphs A-O, the operations further including: obtaining, via the communications interface, a third definition and a third value corresponding to the second empty field of the second PoB; obtaining second behavior information regarding behavior exhibited by the computing device and corresponding to the second PoB; accumulating the second behavior information into a second test pattern based at least in part on the second behavior information corresponding with at least part of the second PoB; and determining whether the second test pattern matches a union of the second PoB and the third value.

Q. A method comprising: obtaining, via a communications interface, a test pattern from a security agent operating on a monitored computing device, the test pattern including: a value that characterizes a portion of behavior exhibited by the monitored computing device and observed by the security agent; making available for selection, via a display device, a plurality of behavior identifiers and a plurality of dispositions for selection; obtaining selections corresponding to a behavior identifier and a disposition from among the plurality of behavior identifiers and the plurality of dispositions, an individual behavior identifier of the plurality of behavior identifiers being associated with one or more dispositions; based at least in part on obtaining the selections, creating a definition that includes the behavior identifier, the disposition, and the value; and transmitting, via the communications interface, the definition to the security agent.

R. The method of paragraph Q, wherein: the value includes a characteristic of behavior exhibited by the monitored computing device or a system state; the behavior identifier includes a tag that characterizes the test pattern as being behavior of benign software or malware; the disposition identifies an action to take if the security agent detects a union of the pattern of behavior and the value; and the method further comprises altering a response of the security agent to detecting that behavior exhibited by the monitored computing device corresponds to the definition by transmitting an update to the definition that includes one or more of a different behavior identifier or a different disposition to replace the behavior identifier or the different disposition.

S. The method of either paragraph Q or R, further comprising: obtaining, via a communications interface, a series of behaviors observed by the security agent that does not match any pattern of behavior (PoB) stored at the security agent; obtaining an indication to create a PoB; creating the new PoB by parameterizing at least a portion of the series of behaviors by removing a value from the series of behaviors and defining the portion as an empty field; obtaining a selection of one of the plurality of behavior identifiers and a selection of one of the plurality of dispositions; at least partially in response to the selection, creating a new definition that specifies the value removed from the event information, a new instance identifier that is associated with the PoB, the selected one of the plurality of behavior identifiers, and the selected one of the plurality of dispositions; transmitting, via the communications interface, instructions to modify a configuration of the security agent to include the new PoB; and transmitting, via the communications interface, the new definition to the security agent.

T. A method comprising: obtaining event information based on behavior exhibited by a computing device; accumulating the event information to create a test pattern; determining whether the test pattern matches any one of a plurality of definitions by determining whether the test pattern matches a pattern of behavior (PoB) having one or more empty fields populated by corresponding one or more parameter values of a respective one of the plurality of definitions; and initiating an action based on a determination that the test pattern matches the PoB with the empty field of the PoB populated by a parameter value of a matched definition and based on a disposition or behavior identifier associated with the matched definition.

U. The method of paragraph T, wherein: the PoB is part of a configuration file of a security agent stored on the computing device; a definition stored in memory accessible to the security agent includes the parameter value and the disposition; and populating the empty field of the pattern of behavior with the parameter value completes a description of a series of behavior exhibited by the computing device.

V. The method of either paragraph T or U further including: receiving an additional definition that includes a second disposition and a second parameter value, a union of the second parameter value and the PoB describing a defined series of computational behavior; and storing the additional definition in memory accessible to the security agent.

W. The method of any one of paragraphs T-V, wherein determining whether the test pattern matches any one of a plurality of definitions is conducted in a single computational pass.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
a processor;
a communications interface;
a memory having stored thereon a security agent including a matcher that recognizes a pattern of behavior (PoB), the PoB including an empty field, wherein the empty field was generated by removing a portion of the PoB;
the memory further having a first definition stored in a first definition file thereon, the first definition including a first value corresponding to the empty field; and
wherein the security agent, when executed by the processor, configures the system to perform operations including:
obtaining, via the communications interface, a second definition file including the first definition and a second definition that includes a second value corresponding to the empty field;
obtaining behavior information regarding behavior exhibited by a computing device and corresponding to the PoB;
accumulating the behavior information into a test pattern based at least in part on detecting that the behavior information corresponds with at least part of the PoB; and
determining whether the test pattern matches a first union of the PoB with the empty field populated by the first value or a second union of the PoB with the empty field populated by the second value.

2. The system of claim 1, wherein:
the first definition further includes a first behavior identifier and a first disposition, the first behavior identifier indicating that the first union is malicious or benign;
the second definition further includes a second behavior identifier and a second disposition, the second behavior identifier indicating that the second union is malicious or benign; and
the operations further comprise:
determining that the test pattern matches the first union, and
based on determining that the test pattern matches the first union, emitting one or more of the first behavior identifier or the first disposition; or
determining that the test pattern matches the second union, and
based on determining that the test pattern matches the second union, emitting one or more of the second behavior identifier or the second disposition; or
determining that the test pattern does not match either the first union or the second union , and
based on determining that the test pattern does not match either the first union or the second union, transmitting at least part of the test pattern via the communications interface to a remote security service or taking no further action.

3. The system of claim 1, wherein determining whether the test pattern matches the first union or the second union is conducted in a single computational pass.

4. The system of claim 1, wherein:
the empty field is a first empty field;
the PoB is a first PoB that is one of a plurality of PoBs that include a second PoB;
the first definition and the second definition are associated with the first PoB; and
the second PoB specifies a second empty field.

5. The system of claim 4, the operations further including:
obtaining, via the communications interface, a third definition and a third value corresponding to the second empty field of the second PoB;
obtaining second behavior information regarding behavior exhibited by the computing device and corresponding to the second PoB;

accumulating the second behavior information into a second test pattern based at least in part on the second behavior information corresponding with at least part of the second PoB; and determining whether the second test pattern matches a union of the second PoB and the third value.

6. A method comprising:

obtaining, via a communications interface, a test pattern from a security agent operating on a monitored computing device, the test pattern including:

a value that characterizes a portion of behavior exhibited by the monitored computing device and observed by the security agent, wherein the value is associated with an empty field of a pattern of behavior (PoB);

making available for selection, via a display device, a plurality of behavior identifiers and a plurality of dispositions for selection;

obtaining selections corresponding to a behavior identifier and a disposition from among the plurality of behavior identifiers and the plurality of dispositions, an individual behavior identifier of the plurality of behavior identifiers being associated with one or more dispositions;

based at least in part on obtaining the selections, creating a definition that includes the behavior identifier, the disposition, and the value; and transmitting, via the communications interface, the definition to the security agent.

7. The method of claim 6, wherein:

the value includes a characteristic of behavior exhibited by the monitored computing device or a system state;

the behavior identifier includes a tag that characterizes the test pattern as being behavior of benign software or malware; and the disposition identifies an action to take if the security agent detects a union of the PoB and the value.

8. The method of claim 7, wherein the method further comprises altering a response of the security agent to detecting that behavior exhibited by the monitored computing device corresponds to the definition by transmitting an update to the definition that includes one or more of a different behavior identifier or a different disposition to replace the behavior identifier or the different disposition.

9. The method of claim 6, further comprising:

obtaining, via a communications interface, a series of behaviors observed by the security agent that does not match any PoB stored at the security agent;

obtaining an indication to create a new PoB; and creating, based at least in part on obtaining the indication, the new PoB by parameterizing at least a portion of the series of behaviors by removing a value from the series of behaviors and defining the portion as new empty field.

10. The method of claim 9, further comprising:

obtaining a selection of one of the plurality of behavior identifiers and a selection of one of the plurality of dispositions;

at least partially in response to the selection, creating a new definition that specifies the value removed from PoB, a new instance identifier that is associated with the PoB, the selected one of the plurality of behavior identifiers, and the selected one of the plurality of dispositions;

transmitting, via the communications interface, instructions to modify a configuration of the security agent to include the new PoB; and transmitting, via the communications interface, the new definition to the security agent.

11. A non-transitory computer-readable medium having processor-executable instructions store thereon that, when executed by one or more processors, cause the processors to perform operations comprising:

receiving, via a communications interface, a definition file including a first value corresponding to an empty field of a pattern of behavior (PoB), wherein the empty field was generated by removing a portion of the PoB;

receiving behavior information regarding behavior exhibited by a computing device and corresponding to the PoB;

determining a test pattern based at least in part on the behavior information and detecting that the behavior information corresponds with at least part of the PoB; and determining whether the test pattern matches a first union of the PoB with the empty field populated by the first value.

12. The non-transitory computer-readable medium of claim 11, wherein the operations further comprise receiving, via the communications interface, a second definition file including a second definition that includes a second value corresponding to the empty field.

13. The non-transitory computer-readable medium of claim 12 wherein:

the first definition further includes a first behavior identifier and a first disposition, the first behavior identifier indicating that the first union is malicious or benign;

the second definition further includes a second behavior identifier and a second disposition, the second behavior identifier indicating that the second union is malicious or benign; and the operations further comprise:

determining that the test pattern matches the first union, and based on determining that the test pattern matches the first union, emitting one or more of the first behavior identifier or the first disposition; or determining that the test pattern matches the second union, and based on determining that the test pattern matches the second union, emitting one or more of the second behavior identifier or the second disposition; or determining that the test pattern does not match either the first union or the union, and based on determining that the test pattern does not match either the first union or the second union, transmitting at least part of the test pattern via the communications interface to a remote security service or taking no further action.

14. The non-transitory computer-readable medium of claim 13, wherein determining whether the test pattern matches the first union or the second union is conducted in a single computational pass.

15. The non-transitory computer-readable medium of claim 12, wherein:

the empty field is a first empty field;

the PoB is a first PoB that is one of a plurality of PoBs that include a second PoB;

the first definition and the second definition are associated with the first PoB; and the second PoB specifies a second empty field.

16. The non-transitory computer-readable medium of claim 15, the operations further including:
- obtaining, via the communications interface, a third definition and a third value corresponding to the second empty field of the second PoB;
- obtaining second behavior information regarding behavior exhibited by the computing device and corresponding to the second PoB;
- accumulating the second behavior information into a second test pattern based at least in part on the second behavior information corresponding with at least part of the second PoB; and
- determining whether the second test pattern matches a union of the second PoB and the third value.

* * * * *